No. 889,774.  
PATENTED JUNE 2, 1908.  
N. DU BRUL.  
CIGAR MOLD.  
APPLICATION FILED NOV. 19, 1907.
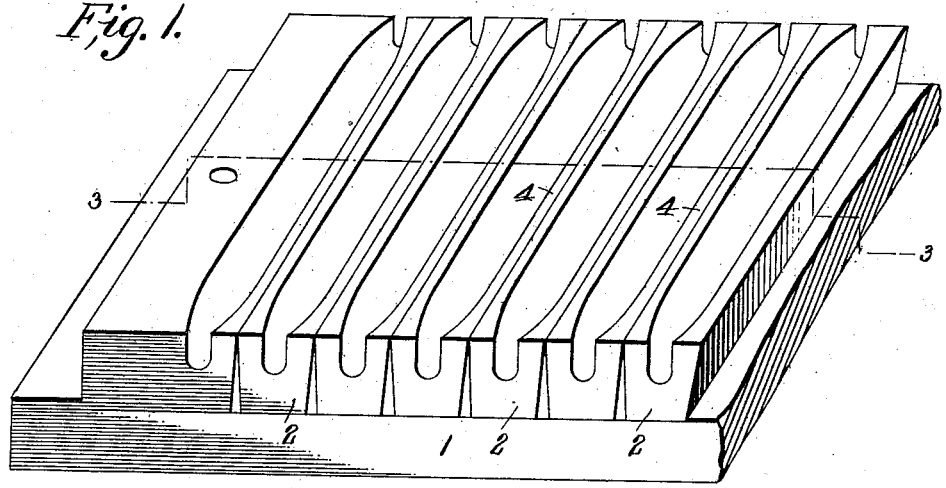
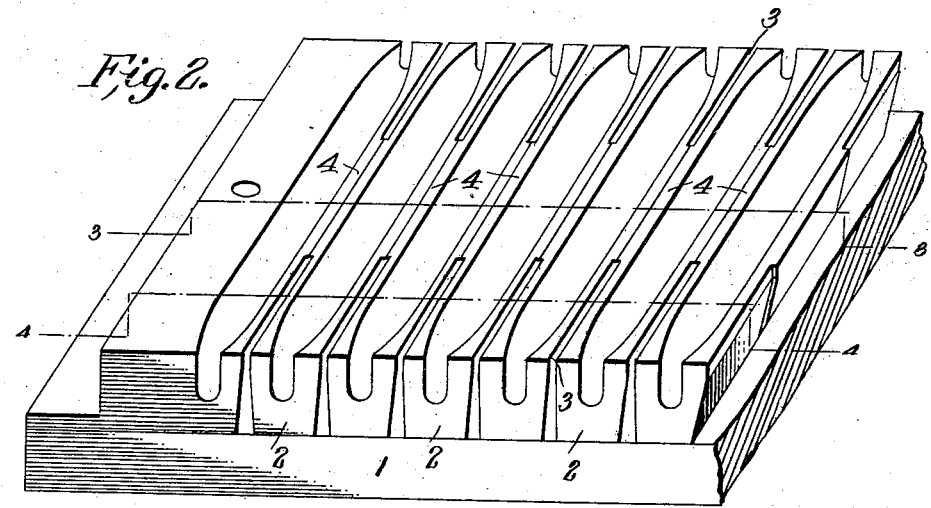
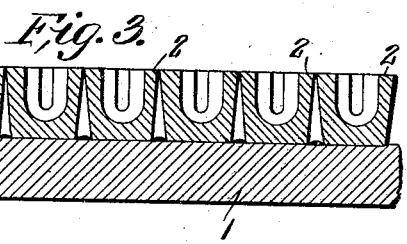
Witnesses  
Jos. F. Collins  
J. M. Wynkoop
Inventor  
Napoleon DuBrul,  
By Knight Bros.  
Attorneys

UNITED STATES PATENT OFFICE.

NAPOLEON DU BRUL, OF CINCINNATI, OHIO.

CIGAR-MOLD.

No. 889,774.     Specification of Letters Patent.     Patented June 2, 1908.

Application filed November 19, 1907. Serial No. 402,838.

*To all whom it may concern:*

Be it known that I, NAPOLEON DU BRUL, a citizen of the United States, residing at Cincinnati, in the county of Hamilton and State of Ohio, have invented certain new and useful Improvements in Cigar-Molds, of which the following is a specification.

My present invention relates more particularly to the construction of the lower member of a cigar mold.

In my Letters Patent No. 847,558, granted March 19, 1907, I have pointed out the advantages of the cavity sections separated and spaced apart, but at the same time so fixed in their spaced relation as to prevent the walls being forced outward under the pressure of the bunch being molded, and thus retain the original size and shape of the cavity which is to be imparted to the bunch; and I have claimed in said patent broadly, the use of spacing portions at suitable points between the cavity sections, to prevent the walls spreading. In carrying out the ideas set forth in said patent, I disclosed a cigar mold in which the portion having the lower cavities formed therein was made from a single piece of material in which the walls of adjacent cavities are separated throughout the greater portion of the area by saw kerfs extending from the upper outer corners of the sections inward and downward so as to leave a spacing and tying portion of the wood between the walls extending from the upper intermediate point downward and outward to the base at the ends. In my co-pending application Serial No. 402,837 I have pointed out the advantage of having the cavity sections still further separated, while maintaining the tying and spacing effect between the walls, said separation extending throughout the area of the ends of the sections and the lower intermediate portions of the sections so as not only to leave the ends of the walls free to yield during the molding operation, but to expose the base of each section in such a manner as to prevent the ill effects of swelling under absorbed moisture; the preferred constructions disclosed in my said co-pending application being such that the bases of the sections are separated throughout the length of the section or transverse dimension of the mold, and the embodiments therein selected for illustrating said features of invention, involving the use of either an integral portion of the material or an inserted piece as the tying and spacing means.

The object of my present invention is to facilitate the manufacture and reduce the cost of molds having their cavity sections substantially separate, yet definitely spaced apart and connected at suitable points. In carrying out my present invention, I construct the lower cavity members of separate sections and so arrange them upon their backing that they are connected at the upper parts of the walls and along an intermediate line of the mold; said connection being preferably in the nature of a mere abutment, throughout the limited area desired, and being produced by the fashioning of the individual cavity sections.

According to one plan herein shown by way of illustration, the separate cavity sections are arranged on their backing in abutment along their longitudinal edges and saw kerfs or other form of cuts, are then made along the dividing lines from the ends inward for such distance as will leave the desired abutting portions along the intermediate line of the mold; the cavity sections being preferably formed with downwardly tapering sides so that they will be exposed throughout their bases and the greater portions of their areas and the separation to be obtained by the subsequent sawing or cutting will be reduced to a minimum and greatly facilitated.

In order that my invention may be fully understood, I will proceed to describe the same with reference to the accompanying drawings in which, Figure 1 represents a block of cavity sections downwardly tapering and applied to the mold backing with their upper edges in abutment and ready for the introduction of the kerfs or cuts which are to separate the sections from the ends inward to the desired extent; Fig. 2 is a view similar to Fig. 1, in which the kerfs or cuts have been formed; Fig. 3 is a section on the line 3—3, Figs. 1 and 2; Fig. 4 is a section on the line 4—4, Fig. 2.

Referring to Figs. 1 to 4, 1 represents the backing of the lower member of a cigar mold and 2 represent separately formed cavity sections mounted thereon in any suitable known manner. Sections 2 are fashioned with downwardly and inwardly inclined side walls in such manner that when the sections are fixed upon their backing, with their upper edges in abutment, their side walls are spaced apart throughout the remainder of their areas. In this relation, the sections are connected in the sense that they are in contact and it is impracticable for their sides to spread; yet their side walls are free from contact. In order to realize the further advantage of having the ends of the side walls flexible, the abutting portions of the cavity sections are separated from the ends inward by kerfs or cuts 3, as shown in Figs. 2 and 4, the intermediate parts of the abutting edges being left to form the spacing connections 4. A further advantage of spacing the members apart and then mounting them upon their backing arises from the accumulation of glue at the bases of the sections as shown at 6 in Figs. 3 and 4, which assists greatly in firmly securing the sections to the backing.

From the foregoing description it will be observed that my invention herein disclosed secures the advantages of having the side walls of the cavity sections separated and provided with air space throughout the greater part of their area, together with the advantage of having the cavity sections separately formed and placed in position; said cavity sections being fixed apart and connected along an intermediate line of the mold and at the upper portions of their opposed walls.

Having thus described my invention, what I claim and desire to secure by Letters Patent is:

1. In a cigar mold a lower member comprising a suitable backing, and separately formed cavity sections secured to said backing with their opposed walls spaced apart, throughout the greater part of their opposed areas, but abutting at suitable points to space the walls.

2. In a cigar mold a lower member comprising a suitable backing, separately formed cavity sections with walls inclined inwardly and downwardly and suitably secured upon said backing with their upper edges in abutment for a portion of the length thereof.

3. In a cigar mold a lower member comprising a suitable backing and separately formed cavity sections with walls inclined inwardly and downwardly secured upon said backing with their upper edges in abutment and having their abutting edges cut away for a portion of the length thereof; to leave the ends of the cavity walls flexible.

The foregoing specification signed at Washington D. C. this 9 day of September, 1907.

.NAPOLEON DU BRUL.

In presence of two witnesses—
HERVEY S. KNIGHT,
EDWIN S. CLARKSON.